United States Patent
Tilston et al.

(10) Patent No.: US 6,766,638 B1
(45) Date of Patent: Jul. 27, 2004

(54) HYDROGEN PEROXIDE BASED PROPULSION SYSTEM

(75) Inventors: John R Tilston, Hampshire (GB); Wai S Cheung, Hampshire (GB)

(73) Assignee: QinetiQ Ltd., Farnborough (GB)

( * ) Notice: Subject to any disclaimer, the term of this patent is extended or adjusted under 35 U.S.C. 154(b) by 0 days.

(21) Appl. No.: 10/048,115

(22) PCT Filed: Jul. 26, 2000

(86) PCT No.: PCT/GB00/02837

§ 371 (c)(1),
(2), (4) Date: Jan. 28, 2002

(87) PCT Pub. No.: WO01/07773

PCT Pub. Date: Feb. 1, 2001

(30) Foreign Application Priority Data

Jul. 26, 1999 (GB) ............................................. 9917404

(51) Int. Cl.[7] .............................. C06D 5/04; F02K 5/04; F23R 5/04
(52) U.S. Cl. .............................. 60/218; 60/246; 60/269; 60/263; 60/262
(58) Field of Search ..................... 60/218, 246, 39.462, 60/269, 263, 262

(56) References Cited

U.S. PATENT DOCUMENTS

| | | | |
|---|---|---|---|
| 3,792,669 A | * 2/1974 | Ueno et al. | ................ 431/91 |
| 3,898,794 A | 8/1975 | Ariga | ................ 60/39.18 |
| 4,004,413 A | * 1/1977 | Ueno et al. | ................ 60/39.462 |
| 4,047,380 A | * 9/1977 | Heffernan | ................ 60/39.461 |
| 4,059,415 A | * 11/1977 | Kosaka et al. | ................ 48/63 |
| 4,135,361 A | 1/1979 | Eisenhaure | ................ 60/39.02 |
| 5,477,672 A | 12/1995 | Tsujikado et al. | ........ 60/39.462 |
| 5,836,150 A | 11/1998 | Garcia | |
| 5,932,940 A | 8/1999 | Epstein et al. | ................ 310/40 |
| 6,082,671 A | 7/2000 | Michelson | ................ 244/72 |
| 6,272,846 B1 | * 8/2001 | Schneider | ................ 60/218 |

OTHER PUBLICATIONS

Cheung, W S et al; "Testing of a Prototype Hydrogen Peroxide Based Propulsion System for Micro Air Vehicles"; Defence Evaluation and Research Agency; Published by NATO Research and Technology Agency; British Crown Copyright 2000.

* cited by examiner

Primary Examiner—Justine R. Yu
Assistant Examiner—William H. Rodriguez
(74) Attorney, Agent, or Firm—McDonnell Boehnen Hulbert & Berghoff LLP

(57) ABSTRACT

A micro air vehicle is propelled by a bipropellant micro engine supplied with hydrogen peroxide and a hydrocarbon fuel. The hydrogen peroxide is decomposed to produce steam and oxygen at high temperature and the hydrocarbon fuel is burnt within a combustion chamber with oxygen produced from such decomposition. Products of such decomposition and combustion are exited through a nozzle to produce thrust. In a preferred embodiment there is also a ducted turbofan located downstream of the nozzle exit.

6 Claims, 1 Drawing Sheet

US 6,766,638 B1

HYDROGEN PEROXIDE BASED PROPULSION SYSTEM

Figure 1:
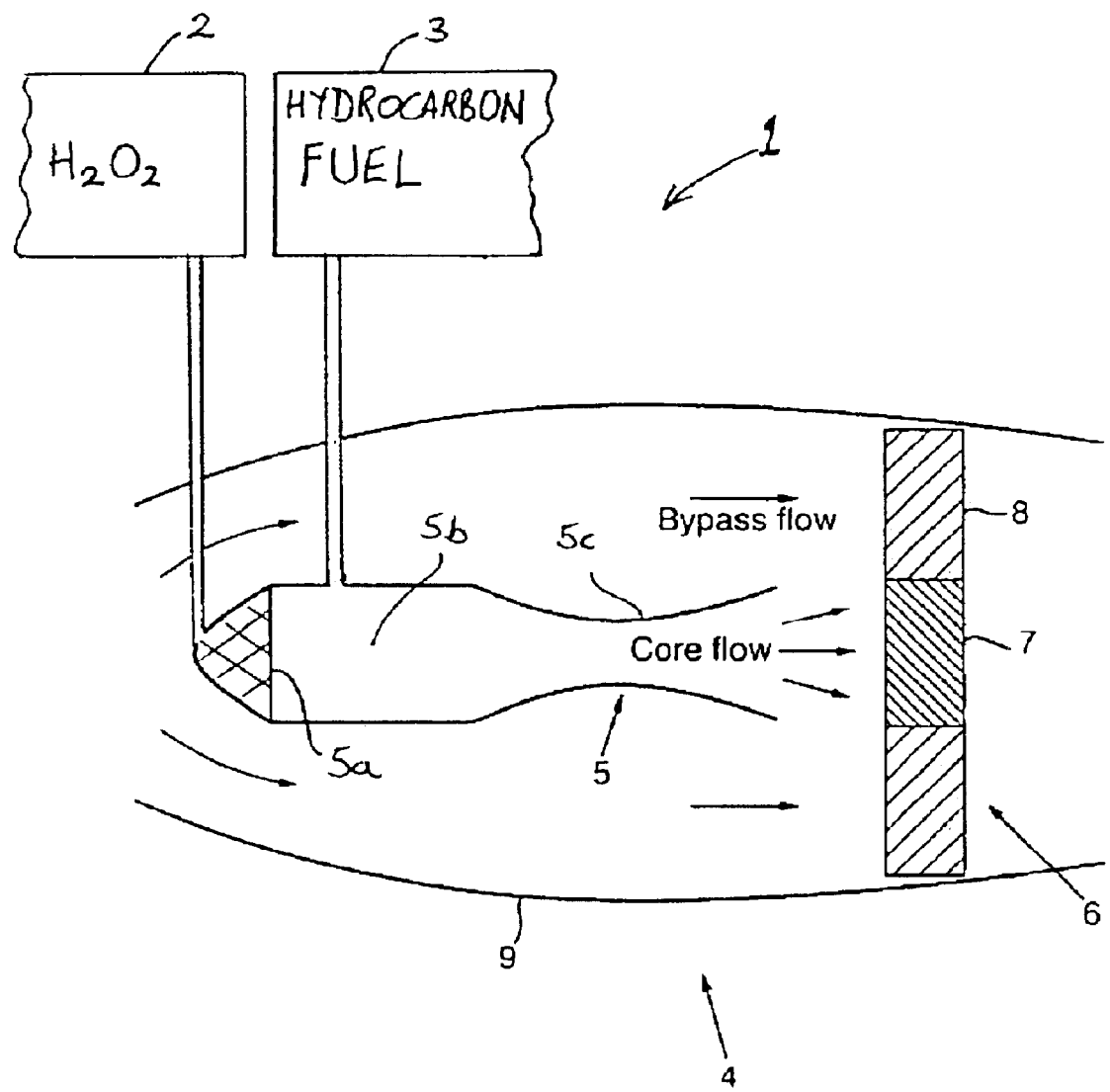

This application is the U.S. national phase of international application PCT/GB00/02837 filed 26 Jul. 2000, which designated the U.S.

BACKGROUND OF THE INVENTION (1) Field of the Invention

The invention relates to hydrogen peroxide ($H_2O_2$) engines and in particular to a novel hybrid rocket/turbine hydrogen peroxide based engine and hydrogen peroxide based propulsion system for micro air vehicle propulsion.

(2) Description of the Prior Art

Micro air vehicles (MAVs) play a key role in military and surveillance operations. For these MAVs, a range of engine characteristics is needed to meet specific requirements, such as low speed, low noise, high speed, etc. In this specification MAVs are defined as air vehicles which have a wingspan of 1 metre or less and/or a weight of 2 kg or less. Features such as weight, ease of starting, reliability, etc. are important in the choice of the power plant. Air breathing engines or motors are usually attractive on weight grounds because they do not have to carry their own oxidant. However this may not be so important at small scales when the mass of the engine itself is relatively high. In addition, of course, small engines have relatively poor thermal and propulsive efficiency due to low cycle temperatures.

Hydrogen peroxide engines are known. The inventors have determined that these engines can be built small enough and give adequate performance requirements for use in MAVs. Hydrogen peroxide can nowadays be generated 'in the field' by electrolytic techniques. It can be decomposed catalytically to produce steam and oxygen at high temperature and is an acceptable propellant in its own right with a high specific thrust and a low infrared (IR) signature.

SUMMARY OF THE INVENTION

The invention comprises a micro engine comprising a source of hydrogen peroxide and a source of hydrocarbon fuel; a decomposition region for decomposition of hydrogen peroxide and a combustion region for combustion of hydrocarbon fuel with oxygen produced from such decomposition; and a nozzle to exit products of such decomposition and combustion.

Further is provided a micro air vehicle equipped with such an engine and a method of propelling a micro air vehicle comprising the steps of decomposing hydrogen peroxide, combusting a hydrocarbon fuel with oxygen produced from such decomposition, and exiting products of such decomposition and combustion through a nozzle.

The invention also comprises a micro air vehicle having an engine having connection means to a tank adapted to contain hydrogen peroxide, a fuel tank connected to a region adapted to decompose hydrogen peroxide, a decomposition region/chamber suitable for decomposing hydrogen peroxide, a nozzle to accelerate the resulting decomposition products, a turbofan located downstream of the exit of said nozzle and located within a duct so as to provide propulsive thrust and means to provide a hydrocarbon fuel adapted to burn by consuming oxygen from the decomposition of hydrogen peroxide.

DESCRIPTION OF THE CURRENT EMBODIMENT

The invention will now be described by way of example only and with reference to the following figures of which:

FIG. 1 shows an embodiment of the invention comprising a decomposition and combustion chamber/nozzle and a ducted fan.

In a simple embodiment of the invention, a MAV power plant 1 includes a fuel tank 2 containing 34 g of $H_2O_2$. To hold this weight of fuel, the fuel tank can be a simple cylinder (2 cm in diameter and 7.5 cm in length). The fuel tank alone will weigh about 16 g if it is made of aluminum and its thickness (1 mm) should be sufficient to contain the pressure inside the tank. The fuel tank is connected to a decomposition and combustion chamber/nozzle 5 comprising a decomposition region with a catalyst 5a, combustion region 5b and a nozzle 5c wherein the combustion chamber/nozzle 5 is of weight less than 2 g.

The decomposition of $H_2O_2$ is an exothermic process in which a substantial rise in temperature occurs. Thermodynamic calculations on a 90% $H_2O_2$ solution show that a temperature of 1022K (749°C.) and a pressure of 35.5 bar (515 psi) are achievable when the decomposition products are allowed to expand adiabatically to atmospheric pressure.

A simple convergent/divergent nozzle is used in the flow parameter calculations necessary to diminish the combustion chamber pressure and nozzle exit area. A chamber pressure of 2.07 bar (30 psi) and a nozzle exit diameter of about 2 mm will produce a mass flow through the nozzle of about 0.17 g/s and an nozzle exit velocity of M 1.1. The thrust produced now is about 0.124 N which is comparable to the amount required to propel an MAV.

In a preferred embodiment, a bipropellant system uses hydrocarbon fuel to consume the excess oxygen. This system uses an additional tank 3 to store the hydrocarbon. This has a clear advantage in endurance over a monopropellant system. However, the gain in endurance must weigh against the increase in combustion temperature and complexity in the fuel system. At temperatures in excess of 2400K, very few materials will be suitable for making the combustion chamber. Also, very efficient cooling techniques must be implemented to avoid damage to the combustion chamber. Preferably the propulsion system utilises hydrogen peroxide and kerosene as fuel and oxygen as the oxidant. A bipropellant ($H_2O_2$ and kerosene) propulsion system has a 70% improvement on flight endurance but has high exhaust temperature (circa 2700K) which makes the design and selection of material for the combustion chamber/nozzle very challenging. A bipropellant system with on-board oxygen gives the best flight endurance.

In the most preferred embodiment the system comprises a bipropellant system as described above with the addition of a ducted fan. Such an arrangement is not known per se. FIG. 1 is a figure showing the arrangement 4 of a hydrogen peroxide based ducted fan engine comprising a decomposition and combustion chamber/nozzle arrangement 5, and a turbofan 6 comprising turbine 7 and fan 8 arranged within a duct 9. In the ducted fan engine design, air passes around the outside of the decomposition and combustion chamber/nozzle. The front of the decomposition and combustion chamber has to be shaped to avoid flow separation. The combustion chamber/nozzle 5 will attain very high temperatures during operation and the bypass flow will help to cool the nozzle. For a bypass ratio of 10, the duct exit flow velocity is found to be about 300 m/s and the duct exit is 3 mm in diameter. The fan rotational speed is estimated to be 1.63E6 rpm. This is due to the small size of the fan. These calculations are based on a nozzle throat area of 1 mm diameter. The total thrust produced by this engine is 0.634 N. The hydrocarbon based fuel is also burnt within the decomposition and combustion chamber, at least in part using oxygen produced by the decomposition of hydrogen peroxide.

What is claimed is:

1. A thrust-producing micro engine comprising a source of hydrogen peroxide and a source of hydrocarbon fuel; a decomposition region for decomposition of hydrogen peroxide and a combustion region for combustion of hydrocarbon fuel with oxygen produced from such decomposition; a nozzle through which, in use, products of such decomposition and combustion flow from said combustion region; and a duct surrounding the exit from said nozzle through which, in use, air is drawn in consequence of such flow.

2. A micro engine according to claim 1 comprising a turbine arranged to be driven by the flow of products from said nozzle and a fan arranged to be driven by said turbine to draw air through said duct.

3. A micro air vehicle equipped with thrust-producing engine comprising: a source of hydrogen peroxide and a source of hydrocarbon fuel; a decomposition region for decomposition of hydrogen peroxide and a combustion region for combustion of hydrocarbon fuel with oxygen produced from such decomposition; a nozzle through which, in use, products of such decomposition and combustion flow from said combustion region; and a duct surrounding the exit from said nozzle through which, in use, air is drawn in consequence of such flow.

4. A micro air vehicle according to claim 3 wherein said engine comprises a turbine arranged to be driven by the flow of products from said nozzle and a fan arranged to be driven by said turbine to draw air through said duct.

5. A method of generating thrust for propelling a micro air vehicle comprising the steps of decomposing hydrogen peroxide, combusting a hydrocarbon fuel with oxygen produced from such decomposition, causing products of such decomposition and combustion to flow through a nozzle, and drawing air through a duct surrounding the exit from said nozzle in consequence of such flow.

6. A method of generating thrust for propelling a micro air vehicle according to claim 5 which comprises driving a turbine by the flow of products from said nozzle and driving a fan by said turbine to draw air through said duct.

* * * * *